Nov. 16, 1971   M. WIENAND   3,619,856
DEVICE FOR MANUFACTURING PLASTIC FOILS, STRIPS AND THE LIKE
Filed May 3, 1968   2 Sheets-Sheet 1

INVENTOR
MICHAEL WIENAND
BY
Lowry, Rinehart & Narkuva

Nov. 16, 1971 M. WIENAND 3,619,856
DEVICE FOR MANUFACTURING PLASTIC FOILS, STRIPS AND THE LIKE
Filed May 3, 1968 2 Sheets-Sheet 2

INVENTOR
MICHAEL WIENAND
BY
Lowry, Rinehart & Markva

United States Patent Office 3,619,856
Patented Nov. 16, 1971

3,619,856
DEVICE FOR MANUFACTURING PLASTIC FOILS, STRIPS AND THE LIKE
Michael Wienand, Siegburg, Germany, assignor to Dynamit Nobel Aktiengesellschaft, Troisdorf, Germany
Filed May 3, 1968, Ser. No. 726,494
Claims priority, application Germany, July 19, 1967, D 53,631
Int. Cl. B29h 9/00
U.S. Cl. 18—2 C
2 Claims

ABSTRACT OF THE DISCLOSURE

The device includes glazing rollers or roller assemblies used to produce plastic foils, strips or the like from viscous plastic masses. The mass is inserted between the rollers or in the roller assemblies so that the plastic material passes between the rollers and is produced in the requisite form of a foil, strip or the like.

BACKGROUND OF THE INVENTION

The use of glazing rollers or roller assemblies to manufacture plastic foils or strips from viscous plastic masses is already known in the prior art. The production of such an article in this manner is accompanied by bending forces that result when the plastic foil or strip passes through these rollers. The roller diameters are so selected for a determined working width that these bending forces can be taken up by the rollers. One of the major concerns for the plastic foil or strip being produced is that it has a uniform thickness throughout its construction. Any variation in thickness of the plastic foil or strip over the breadth thereof while it is being manufactured is reduced to a minimum by lapping or oblique positioning of the rollers. The roller diameters presently used in production plants lie between 400 and 800 mm. When hot plastic material is fed into the supply slot between these large diameter rollers, a large kneading rim is formed. That is, a large buildup of the hot plastic mass occurs between the rollers which are forming the desired foil or strip. The hot plastic material is subjected to a strong beating and an intense mixing which is undesirable in many cases. This is especially true in instances where there are two or more materials of different colors being used in the manufacture of the plastic foil or strip. It is known that when feeding a roller assembly having rollers which have a diameter of 500 mm. that a kneading rim having a height of 120 mm. is formed. The material in this case is a hot, colored granulate. In this specific instance the foils of this production process are strongly mixed and drawn out causing them to have a lower degree of utility.

SUMMARY OF THE INVENTION

An object of this invention is to avoid the formation of large kneading rims at the supply slot in a device for manufacturing plastic foils or strips.

It is another object of this invention to provide glazing rollers or roller assemblies to manufacture plastic foils or strips.

The present invention is an apparatus for the manufacture of plastic foils, strips or the like from a viscous plastic mass. The apparatus includes glazing rollers or roller assemblies through which the mass or a sampling granulate is fed. The device further includes a supply slot formed by at least two rollers through which the mass or granulate must pass before it is introduced between the glazing rollers or roller assemblies. At least one of the rollers in the supply slot has a small diameter. A support roller is located in abutting relationship with each small diameter roller.

The kneading rim of the material introduced into a supply slot having a roller of larger diameter and a roller of smaller diameter reaches a relatively small height. Because the kneading rim is of such a relatively small height, the working of the viscous plastic material is less than when the material is fed through a slot between two large rollers which causes a kneading rim having a relatively large height. Other advantages also are attendant the use of a supply slot manufactured in accordance with this invention. These include a weak mixing of colored granulate which is fed into the supply slot giving rise to a short sampling in the foil or strip. Furthermore, the product is found to be more uniform than when feeding the material over rollers having large diameters. A support roller is used in conjunction with the small diameter rollers of the supply slot to take up any bending forces arising in the small diameter rollers during the production of the plastic foil or strip. The diameter of the support roller depends on the extent of the bending stress and the particular material used for construction of the support roller.

The ratio of diameter to working width in a small diameter roller is selected to be less than 1:6. Advantageously, rollers having a diameter lying below about 200 mm. are used in the structure of the supply slot disclosed herein.

BRIEF DESCRIPTION OF DRAWINGS

Embodiments of the present invention will now be described, by way of example, with reference to the accompanying drawings, in which.

DESCRIPTION OF SPECIFIC EMBODIMENTS

Figure 1:
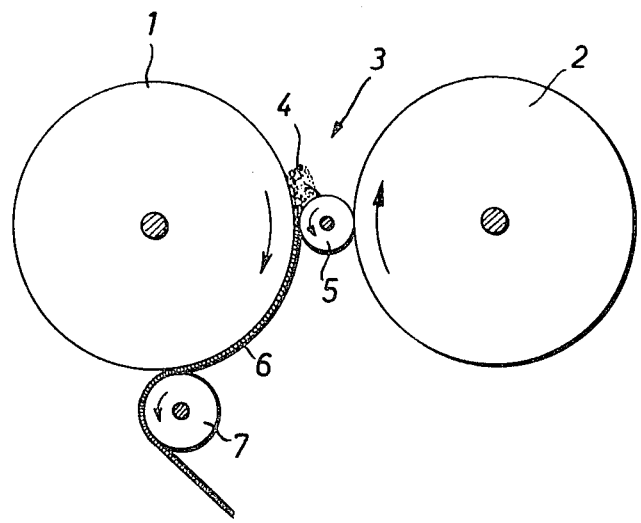
FIG. 1 shows an apparatus having a supply slot formed by one large diameter roller and one small diameter roller.

A supply slot generally designated 3 for an apparatus constructed in accordance with this invention is formed by a large diameter roller 1 and a small diameter roller 5 in FIG. 1. A mass of viscous plastic material 4 is fed through the supply slot 3 thereby forming a plastic foil or strip 6. A roller 2 supports the small roller 5 to take up bending forces encountered due to thickness variations in the breadth of the manufactured foil 6. The rollers 1 and 5 which form the supply slot 3 can be lapped or obliquely positioned. The manufactured foil 6 is drawn off the large diameter roller 1 at the turning roller 7. Although the diameter of the support roller 2 may be greater or smaller than that of roller 1, it is shown to have a diameter which is about equal to that of roller 1 in FIG. 1. The choice of the material to be used for the construction of the support roller 2 is not a function of the characteristics or behavior of the material being processed because the support roller 2 does not come into contact with the material 4 during the formation of the foil 6. However, the diameters of the large roller 1 and small roller 5 are dependent upon the quality of the foil 6 desired to be produced. It has been found that when a small roller 5 having a diameter of 100 mm. and a large roller 1 having a diameter of 500 mm., the kneading rim formed by the material 4 reaches a height of about 30 mm. However, when two rollers each having a diameter of 500 mm. are used to form the slot, the kneading rim formed by the material 4 rises to a height of about 120 mm.

Figure 2:
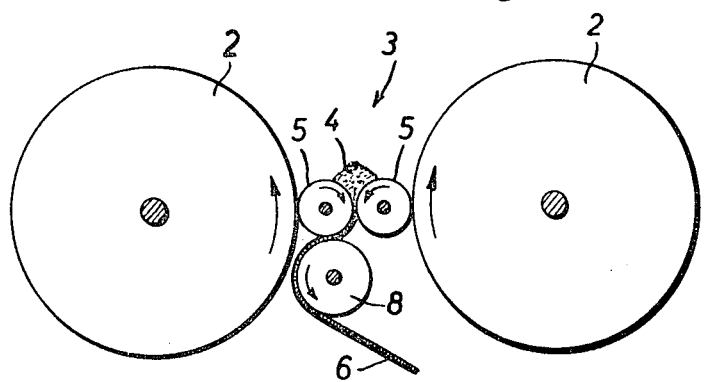
FIG. 2 shows a roller assembly in accordance with the invention wherein the supply slot is formed two small diameter rollers.

A second embodiment as shown in FIG. 2 includes two small diameter rollers 5 which form the supply slot 3. Each of the small diameter rollers 5 are supported by a support roller 2. The mass of plastic material 4 is fed between the small diameter rollers 5 to form a plastic strip 6 which is drawn off of the forming rollers at the turning roller 8.

Figure 3:
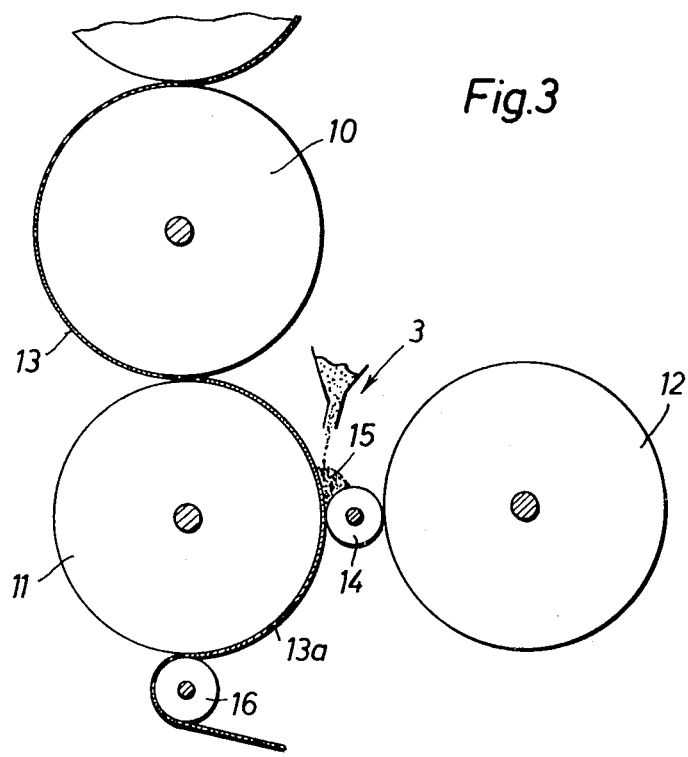
FIG. 3 is a schematic view of a further embodiment of an apparatus made in accordance with this invention.

The apparatus of FIG. 3 is used in a marbling process of forming a plastic strip 13. Although more than one supply slot is used in this apparatus, only the last supply slot 3 is shown. The supply slot 3 is formed by a small diameter roller 14 and supported by a roller 12. A partially processed foil or strip 13 is led over glazing rollers 10 and 11 and passes through the supply slot 3. An additional amount of colored granulate 15 is supplied in the said supply slot 3 to form the completed strip 13a. The strip 13a is led off the roller 11 over a turning roller 16. A short and uniform sampling is achieved on the completed strip 13a as a result of using the small diameter roller 14 in the supply slot 3 which provides a small kneading rim of plastic viscous material 15.

While the device for manufacturing plastic foils, strips or the like has been shown and described in detail, it is obvious that this invention is not to be considered as being limited to the exact form disclosed, and that changes in detail and construction may be made therein within the scope of what is claimed, without departing from the spirit of this invention.

Having thus set forth and disclosed the nature of this invention, what is claimed is:

1. An apparatus for the manufacture of a plastic product such as foil, strip, or the like from a viscous plastic mass comprising:
    (a) roller means for forming and controlling thickness of the plastic product,
    (b) said roller means including a slot means for providing the viscous plastic mass to be formed into the plastic product,
    (c) said slot means being formed by at least two rollers, at least one of which has a small diameter of less than about 200 mm. with the ratio of the diameter to working breadth being less than about 1:6 to produce a kneading rim small enough to eliminate a strong beating and intense mixing of the viscous plastic mass, and
    (d) a roller means located in abutting relationship to each small diameter slot roller to support and prevent bending of said small diameter slot roller whereby the thickness of the plastic product may be maintained uniform.

2. Apparatus as claimed in claim 1 comprising a plurality of said slot means arranged in series such that said plastic product formed in the first of said slot means is subjected to treatment in at least one further slot means, means being provided to supply colored granulate to one of said further slot means between a small diameter roller and the plastic product formed in the first mentioned slot means whereby a design is formed in the surface of said plastic product after passing through said one further slot means.

References Cited

UNITED STATES PATENTS

| 2,779,387 | 1/1957  | Schairer       | 18—2 |
| 3,366,992 | 2/1968  | Seanor et al.  | 18—2 C UX |
| 1,744,017 | 1/1930  | Steckel        | 18—2 C UX |
| 1,900,344 | 3/1933  | Iversen        | 18—2 C UXX |
| 2,039,959 | 5/1936  | Iversen        | 18—2 C UXX |
| 2,025,562 | 12/1935 | Balsiger       | 18—2 C |
| 2,167,544 | 7/1939  | De Bito et al. | 18—2 C UXX |
| 3,354,502 | 11/1967 | Powell         | 18—2 C |
| 3,433,047 | 3/1969  | Powell         | 18—2 C UXX |

WILLIAM S. LAWSON, Primary Examiner

L. GILDEN, Assistant Examiner

U.S. Cl. X.R.

18—2 F